UNITED STATES PATENT OFFICE.

RUDOLF LANGHANS, OF BERLIN, GERMANY.

PROCESS OF PRODUCING CUPRO-AMMONIACAL SOLUTIONS OF CELLULOSE.

SPECIFICATION forming part of Letters Patent No. 672,946, dated April 30, 1901.

Application filed February 20, 1900. Serial No. 5,981. (No specimens.)

*To all whom it may concern:*

Be it known that I, RUDOLF LANGHANS, a subject of the Emperor of Austria-Hungary, and a resident at No. 6 an-der-Stadtbahn, Berlin, in the Kingdom of Prussia, German Empire, have invented a certain new and useful Improved Process of Producing Cupro-Ammoniacal Solutions of Cellulose; and I do hereby declare that the following is a full, clear, and exact description of the invention, which will enable others skilled in the art to which it appertains to make and use the same.

The present invention relates to the production of solutions of such members of the cellulose group—$n(C_6H_{10}O_5)$—as constitute the cellular tissue of plants—that is to say, cellulose of any origin and kind—as also of cellulose derivatives—such as oxycellulose, hydrocellulose, &c.—and related bodies, such as colloidal cellulose, and of silk, by means of ammoniacal solutions of cupric oxid or cuproammoniacal liquors; and it consists in the improved process hereinafter fully specified by which I am enabled to dissolve by far larger quantities of said substances in a given quantity of an ammoniacal solution of cupric oxid and to considerably diminish the time required for performing the solution as compared with the cupro-ammonia process as heretofore practiced.

I found that when cotton was brought together with a saturated solution of cupric oxid in ammonia—*i. e.*, the well-known cuproammonium liquor—in the presence of free—that is, undissolved or uncombined—cupric hydroxid a by far greater quantity of cotton was dissolved than without the presence of such free cupric hydroxid, but that a greater or smaller proportion of said hydroxid was absorbed, according as the quantity of cellulose applied was greater or smaller, so that by the addition of a sufficiently great quantity of cotton all of the free cupric hydroxid could be caused to disappear when a further addition of cotton remained undissolved. From this behavior of cellulose and cupric hydroxid, not yet heretofore observed, in connection with the fact that the cellulose precipitated from such solution contained copper, which could not be removed by mere washing with water, but required a dilute acid to be applied, I was led to the conclusion that cellulose and cupric hydroxid might combine together chemically into a compound by far more soluble in the cupro-ammonia liquor than pure cellulose. This suggested the idea that it might be possible to obtain a highly-concentrated cellulose solution by properly applying my discovery, and by reducing this idea to practice I have succeeded in producing clear and perfectly homogeneous cellulose solutions as thick as a consistent syrup, showing the brilliant blue color of cupro-ammoniacal liquors.

The essence of my invention, therefore, consists in so carrying out the cupro-ammonia process that the cupro-ammonia liquor is caused to act upon the cellulose in the presence of free cupric hydroxid, or, in other terms in treating the cellulose with a mixture of cupro-ammoniacal liquor and free cupric hydroxid.

To serve as a guidance for carrying out my invention, I proceed to give the following example: Cupric hydroxid carefully prepared from one hundred and fifty grams of cupric sulfate is macerated with fifteen hundred grams of watery caustic ammonia of 0.910 specific gravity until a saturated solution is obtained which contains free cupric hydroxid. To the mixture thus obtained of saturated cupro-ammonia liquor and free cupric hydroxid are added one hundred grams of perfectly purified cotton, the addition being made by portions—for instance, by four portions of twenty-five grams each—and each succeeding portion preferably added after complete solution of the preceding one. When the fourth portion has been dissolved away, no more free cupric hydroxid will be found. The clear solution obtained is of a syrup-like consistency and perfectly homogeneous. The process should be carried out in a closed vessel, and the mixture of liquor, cupric hydroxid, and cotton repeatedly agitated or shaken.

Proceeding in the reverse has not proved to be a practical process.

In a similar manner as described with reference to cotton behave all such members of the cellulose group—$n(C_6H_{10}O_5)$—as constitute the cellular tissue of plants or compose the walls of vegetable cells—that is to say, cellulose of various origins (cotton, flax, hemp, jute, esparto, Manila hemp, ramie, straw, wood, &c.) and various kinds vasculose, paracellulose, fibrose, lignin, fungin, tunicin, &c., cellulose derivatives, such as oxycellulose, hydrocellulose, &c., related bodies, such as colloidal cellulose, and, moreover, silk, which latter has proved to be a true equivalent for cellulose in so far as the present invention is concerned. Therefore I wish it to be understood that the term "cellulose," as used in the title, the present specification, and its annexed claims, is intended to include said members of the cellulose group, the said derivatives and related bodies, as also silk.

In practicing my invention I have, moreover, found that the solution is considerably accelerated when the cellulose has previously been treated with a strong alkaline lye—that is to say, with a lye containing fifteen to twenty-eight per cent. of sodium or potassium hydroxid—whereby the cellulose is caused to combine with some alkaline oxid. In preparing the cellulose I prefer to treat the same prior to treatment with the strong alkaline lye first with a weak alkaline lye and after washing with water with hydrochloric acid of twenty per cent., when it is washed anew with water. After treatment with the strong alkaline lye the cellulose is again washed with water and dried.

It is evident that by varying the quantity present of free cupric hydroxid solutions of any desired degree of concentration may be produced. I, however, prefer to prepare a solution as concentrated as possible and to reduce the same down to the desired degree of concentration by first adding water and then caustic ammonia.

The product of my improved process is intended to be used for all purposes for which cellulose solutions are employed—that is to say, for manufacturing artificial silk, filaments, films, &c., for coating, impregnating, printing, and the like purposes, the products being finally passed when required through an acid-bath, preferably a nitric-acid bath, (preferably thirty per cent. of acid,) in order to remove the copper they contain.

I claim as my invention—

1. The process of producing solutions of cellulose which consists in acting upon cellulose with a saturated ammoniacal solution of cupric oxid in the presence of free cupric hydroxid, substantially as described.

2. The process of producing solutions of cellulose which consists in preparing a saturated cupro-ammoniacal liquor, providing in the same a quantity of free cupric hydroxid, and adding cellulose, substantially as described.

3. The process of producing solutions of cellulose which consists in preparing a saturated cupro-ammoniacal liquor, providing in the same a quantity of free cupric hydroxid, and adding cellulose previously treated with an alkaline lye, substantially as described.

4. The process of producing solutions of cellulose which consists in treating cupric hydroxid with a proportion of watery caustic ammonia sufficient only for dissolving part of the cupric hydroxid present, and adding cellulose, substantially as described.

In testimony whereof I have hereunto set my hand in presence of two subscribing witnesses.

RUDOLF LANGHANS.

Witnesses:
HENRY HASPER,
WOLDEMAR HAUPT.